(12) United States Patent
Tiessen et al.

(10) Patent No.: US 10,779,470 B2
(45) Date of Patent: Sep. 22, 2020

(54) DEVICE FOR HARVESTING STALK-LIKE STEM CROPS

(71) Applicant: Carl Geringhoff GmbH & Co. KG, Ahlen (DE)

(72) Inventors: Reimer Tiessen, Oldenburg (DE); Andre Hemmesmann, Sassenberg (DE); Martin Beumker, Wadersloh (DE); Thomas Gersmann, Warendorf (DE); David Scharmann, Beckum (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 213 days.

(21) Appl. No.: 15/758,368

(22) PCT Filed: Sep. 23, 2016

(86) PCT No.: PCT/EP2016/001593
§ 371 (c)(1),
(2) Date: Jul. 19, 2018

(87) PCT Pub. No.: WO2017/054913
PCT Pub. Date: Apr. 6, 2017

(65) Prior Publication Data
US 2018/0325030 A1     Nov. 15, 2018

(30) Foreign Application Priority Data
Sep. 28, 2015 (DE) .................. 10 2015 116 370

(51) Int. Cl.
*A01D 41/14* (2006.01)
*A01D 45/02* (2006.01)

(52) U.S. Cl.
CPC ......... *A01D 41/147* (2013.01); *A01D 45/021* (2013.01); *A01D 45/023* (2013.01)

(58) Field of Classification Search
CPC .. A01D 45/021; A01D 45/023; A01D 41/147; A01D 43/082; A01D 43/083; A01D 61/004; A01D 57/06
See application file for complete search history.

(56) References Cited

U.S. PATENT DOCUMENTS

| 94,549 | A | * | 9/1869 | Bell | ............ A01D 45/021 56/88 |
|---|---|---|---|---|---|
| 1,964,579 | A | | 6/1934 | Hyman | |

(Continued)

FOREIGN PATENT DOCUMENTS

| CA | 2 226 200 | 11/1998 |
|---|---|---|
| EP | 2 335 472 | 6/2011 |

(Continued)

*Primary Examiner* — Thomas B Will
*Assistant Examiner* — Joan D Misa
(74) *Attorney, Agent, or Firm* — Gudrun E. Huckett

(57) ABSTRACT

The present invention relates to a device (2) for harvesting stalk-like stem crops, having a number of picking units (4) which are arranged alongside one another on the frame (6) of the device (2) and each have picking plates (12), laterally delimiting a picking gap (14), and picking rotors (16) located therebeneath, conveying units which are assigned to the respective picking units (4), are configured as continuous conveyors (22) that are driven in circulation, are arranged on opposite sides above a picking gap (14) and are configured with drivers (18) fastened to the circulating elements, and a transverse conveying device (8) arranged downstream of the conveying units. In order to find an arrangement for the continuous conveyors which results in a reduced overall width without the intake of laid maize being substantially impaired, it is proposed that the axes of rotation (24) of front deflection wheels (26) of the continuous conveyors (22) be positioned obliquely at an angle (32) transversely to the working width of the device (2) and to the picking plane (28), which is defined by the mutually facing front edges of (Continued)

the picking plates (12) assigned to a picking gap (14), such that the axes of rotation (24), considered to be lengthened, intersect above the picking plates (12) at a distance from the picking plane (28), and the drivers (18) formed on the continuous conveyors (22) are for their part positioned upwardly at an angle (30) to the axis of rotation (24) of the deflection wheels (26).

13 Claims, 6 Drawing Sheets

(56) References Cited

U.S. PATENT DOCUMENTS

| | | | | |
|---|---|---|---|---|
| 2,542,573 A * | 2/1951 | Rosenthal | ............ | A01D 45/021 56/111 |
| 2,934,879 A * | 5/1960 | Jones | ............ | A01D 45/021 56/63 |
| 2,970,420 A * | 2/1961 | Schmidt | ............ | A01D 45/021 56/98 |
| 3,271,940 A * | 9/1966 | Ashton | ............ | A01D 41/141 56/105 |
| 4,009,557 A * | 3/1977 | Reicks | ............ | A01D 45/021 56/98 |
| 5,826,415 A * | 10/1998 | Becker | ............ | A01D 45/021 56/66 |
| 5,878,560 A | 3/1999 | Johnson | | |
| 5,881,542 A | 3/1999 | Togami et al. | | |
| 5,884,464 A | 3/1999 | McMillen | | |
| 5,924,269 A | 7/1999 | McMillen | | |
| 9,560,804 B1 * | 2/2017 | Calmer | ............ | A01D 45/025 |
| 10,602,666 B2 * | 3/2020 | Ricketts | ............ | A01D 57/06 |
| 2010/0162675 A1 | 7/2010 | Komlosi | | |
| 2014/0059994 A1 | 3/2014 | Surmann et al. | | |

FOREIGN PATENT DOCUMENTS

| | | |
|---|---|---|
| RU | 2466526 | 8/2011 |
| RU | 2561524 | 12/2014 |
| WO | 2013/089074 | 6/2013 |

* cited by examiner

DEVICE FOR HARVESTING STALK-LIKE STEM CROPS

BACKGROUND OF THE INVENTION

The present invention relates to a device for harvesting stalk-like stem crops, having a number of picking units arranged side by side on the frame of the device, each of which has picking plates that laterally delimit a picking gap and picking rotors located beneath said picking plates, said device also having conveying units embodied as continuous conveyors driven in circulation, which are assigned to the respective picking units, are arranged on opposite sides above a picking gap, and have carrier elements attached to the circulating elements, and a transverse conveying device located downstream of the conveying units.

For the most part, the devices of interest here for harvesting stalk-like stem crops are installed on combine harvesters as corn picker heads for harvesting corn grain. In the corn picker heads, the ears of corn are separated from the stalks, the stalks and leaves are discarded onto the ground, and the picked ears of corn are delivered to the combine harvester for threshing. In the picking operation, the plant stalks are pulled downward by at least one picking rotor once the plant stalk has entered the picking gap, which is delimited by at least one laterally disposed picking plate. When an ear of corn attached to the corn stalk reaches the picking gap, it becomes caught on the picking plate(s), whereas the stalk is carried further downward because it is wider than the picking gap. This causes the ear of corn to tear away from the stalk. The carrier elements circulating continuously with the continuous conveyors, for example chain conveyors or belt conveyors, then catch the separated ears of corn and feed them to the transverse auger, which collects the separated ears of corn at the center of the device and delivers them rearward to the combine harvester. Two continuous conveyors having conveyor chains or belts, for example, are typically used in a picking unit, and are arranged in a plane above the picking plates and on both sides of the picking gap. The axes of rotation of the deflecting wheels are parallel to one another. Wherever chains and belts are specified in the following as conveying elements of a continuous conveyor, these are understood to represent any technical means that are capable of circulating and thereby moving carrier elements along the picking gaps.

The continuous conveyors each circulate on at least one front and one rear deflecting wheel. The purpose of the continuous conveyors is not only to transport the cornstalks out of the area of the picking gap, but also to pick up and lift cornstalks lying in the field in the area of the front deflecting wheel, and enable these laid cornstalks to enter the picking gap. For this purpose, it is beneficial for the front of the continuous conveyor to reach as close to the ground as possible. The position of the lowest point on the continuous conveyor is determined by the spatial positioning of the front deflecting wheel since, due to the circular shape of the deflecting wheel, the continuous conveyor reaches its lowest point at only one location as it travels around the deflecting wheel. The diameter of the deflecting wheel determines the distance of the lowest point from the center of the picking gap.

The devices known from the prior art are designed for use with 30-inch row widths of stalk-like stem crop, and function satisfactorily with flat-lying deflecting wheels. The continuous conveyors themselves are disposed sloping upward from the field toward the rear, to allow the picking rotors to be positioned beneath them. However, the axes of rotation of the deflecting wheels are not set at an angle transversely to the picking gap. In this arrangement, the foremost point on the deflecting wheel determines the lowest position of the continuous conveyor.

In cereal farming, some experts are now advocating halved row widths of 15 inches for the cultivation of stalk-like stem crops. However, conventional harvesting techniques cannot be used with such row widths. The deflecting wheels cannot simply be reduced to half the overall width, because the chains or belts of a continuous conveyor rely on certain minimum radii. Nor is it possible to dispense with one continuous conveyor per picking gap without creating disadvantages in terms of the removal therefrom of picked ears of corn. If only one continuous conveyor is provided per picking gap, the ears of corn are caught only on one side and may sidestep the carrier elements.

For a device of the type in question, U.S. Pat. Nos. 5,884,464 and 5,924,269 propose staggering the heights of the continuous conveyors and allowing the continuous conveyors to overlap on the sides facing away from the picking gaps, in order to save on overall width. However, the higher positioning of the continuous conveyors results in a less effective intake of laid corn.

For narrower crop row widths, it is known from U.S. Pat. No. 5,878,560 to position the axis of rotation of the front deflecting wheel obliquely at an angle transversely to the picking plane of the picking gap, so that the axes of rotation intersect, thereby reducing the overall width required by the continuous conveyor over the working width of the device. The carrier elements remain in the plane of rotation of the deflecting wheels. The picking plane is determined by the position of the two front edges of the picking plates in the area of the picking gap and is roughly horizontal, whereas the axes of rotation of the deflecting wheels are set at approximately 45° from the picking plane. However, the oblique positioning of the axes of rotation raises the foremost deflection point of the two front deflecting wheels, resulting in a less effective intake of laid corn. To achieve a narrow overall width, the continuous conveyors must be positioned at a very steep angle. The covering hoods then protrude substantially higher between the picking gaps because the overall width of the continuous conveyors has remained unchanged. The tall covering hoods impede the flow of harvested crop material.

From U.S. Pat. No. 5,881,542 it is known to position the two deflecting wheels of the continuous conveyors of a picking unit oblique to the picking plane in the same direction in order to decrease the overall width. To accomplish this, the carrier elements of the two continuous conveyors are offset in different directions from the axis of rotation of the respective continuous conveyor, specifically those of one continuous conveyor upward and those of the other downward, so that the carrier elements extend above the picking gap in a conveying plane defined by said carrier elements, parallel to the picking plane. Because of the downward angled carrier elements of one continuous conveyor, the picking plane must be raised to prevent these carrier elements from traveling forward too close to the ground. And again, this causes the upward angled carrier elements to be spaced too far from the ground, resulting in a less effective intake of laid corn.

The object of the present invention is to find an arrangement for the continuous conveyors that will result in a decreased overall width without significantly impairing the intake of laid corn.

SUMMARY OF THE INVENTION

The object is achieved for a device of the type in question, in that the axes of rotation of front deflecting wheels of the continuous conveyors are positioned obliquely at an angle transversely to the working width of the device and to the picking plane, which is defined by the mutually facing front edges of the picking plates assigned to a picking gap, such that the imaginary extensions of the axes of rotation intersect above the picking plates at a distance from the picking plane, and the carrier elements formed on the continuous conveyors are for their part positioned upward at an angle to the axis of rotation of the deflecting wheels.

The obliquely angled positioning of the axes of rotation of the deflecting wheels transversely to the working width of the device reduces the width requirement of the continuous conveyors across the overall width of the device. The overall width is reduced further by the upward positioning of the carrier elements of the two continuous conveyors. The device can be used for 15-inch row widths. Of course, the imaginary extensions of the axes of rotation do not actually need to be long enough to intersect above the picking gap at a distance from the picking plane; rather, the axes of rotation need only to be long enough to support the deflecting wheels of the deflecting conveyors. Otherwise they would impede the flow of material.

However, the oblique positioning of the deflecting wheels transversely to the working width of the device and to the picking plane makes it unnecessary, in particular, to raise the picking plane and/or to position the continuous conveyors themselves at a higher level. The foremost deflection point of the deflecting wheels of the continuous conveyors therefore remains very low and close to the ground. In addition, the carrier elements traveling around the front deflecting wheels traverse a spatial movement path in which they first travel from a higher level toward the ground down to the front deflection point, and after passing the front deflection point they move back upward again, and in so doing, due to the upwardly offset position of the carrier elements, they are better able to pick up and carry along stem crop material lying close to the ground.

Whenever the front or the rear is mentioned in this description, this specification is understood as the orientation of the device toward the standing crop material. The front is the area with which the device is moved into the standing crop, and the rear is the direction in which the crop material gathered by the device is delivered to the combine harvester.

According to one embodiment of the invention, the axes of rotation of the deflecting wheels of the continuous conveyors are positioned obliquely at an angle α to the picking plane, transversely to the working width of the device and to the picking plane to the picking plane, which is defined by the mutually facing front edges of the picking plates assigned to a picking gap, and the carrier elements located on the continuous conveyors are positioned obliquely at an angle β to the circulating plane defined by the deflecting wheels, the angle β being selected such that the carrier elements circulate along a boundary curve in which, in their removal direction, the lower edge of said carrier elements is aligned in a plane parallel to the picking plane. The distribution of the setting angles between the oblique positioning of the axes of rotation and the offsetting of the carrier elements transversely to the working width of the device and to the picking plane results in crop-friendly transitions in the areas of transition to other machine parts, and in the optimal utilization of installation space. The covering hoods between the intake gaps do not protrude too high, but there is still sufficient space for the intake of crop material, for the picking operation, and for transporting the picked ears of corn out of the area. The plane-parallel circulation of the carrier elements with their lower edges facing the picking plane, enables crop material lying on the picking plates to be cleanly and reliably caught and transported away rearward. Even small individual grains are not left on the picking plates, and are instead carried away. Also avoided is grain breakage, which might otherwise occur from grains becoming squeezed between the carrier elements and the surface of the picking plates during transport, and thereby damaged.

According to one embodiment of the invention, angles α and β are each approximately or precisely 45°. A variation of plus or minus 5° is considered non-critical. With these angular dimensions, as each of the carrier elements travels forward during a revolution, its lower edge extends upward at precisely or roughly a right angle to the lower edge of the carrier element that is returning in the removal direction. In this returning position, the carrier elements require only a small width dimension, because they are aligned with their conveying width facing upward, thereby further reducing the possible distance between picking rows in a device.

According to one embodiment of the invention, in the front region of the continuous conveyors, a plurality of deflecting wheels are arranged offset from one another laterally and longitudinally along the device, wherein for each continuous conveyor, the foremost deflecting wheel is located a greater lateral distance from the longitudinal center axis of the intake gap than the deflecting wheel located further toward the rear, and the plurality of deflecting wheels of the continuous conveyors assigned to a picking gap delimit a roughly V-shaped intake opening, in portions of which the mutually opposing continuous conveyors have a linear profile. In an arrangement in which the picking gap and the picking plates slope upward toward the rear, the circulating path for the continuous conveyors created between the two front deflecting wheels does not travel upward with the carrier elements immediately after the foremost deflecting wheel, and instead travels sideways initially, in a roughly or precisely horizontal plane. A continuous conveyor that initially travels roughly horizontally close to the ground in the intake region, extending in roughly a funnel shape from the two sides of the picking gap, enables laid corn that is still active for transport to be picked up from the ground and transported into the area of the picking gap, even when the crop material is in very narrow rows. At the same time, with normally standing crop stalks, there is no risk of losses from shaking caused by overly aggressive transport, and no risk of standing stalks being crushed.

According to one embodiment of the invention, the axes of rotation of the rear deflecting wheels of the continuous conveyors are positioned obliquely at an angle transversely to the working width of the device and to the picking plane, such that the imaginary extensions of said axes of rotation intersect above at a distance from the picking plane. As a result, the chains or belts of the continuous conveyors are not staggered, or are staggered only slightly during circulation.

According to one embodiment of the invention, the axes of rotation of the rear deflecting wheels of the continuous conveyors are positioned at an angle of precisely or approximately 45° to the picking plane. With the rear deflecting wheels, this also results in the advantage that the necessarily uniform distribution of the setting angles between the oblique positioning of the axes of rotation and the offsetting of the carrier elements results in crop-friendly transitions in the areas of transition to other machine parts, and that the installation space in the removal region of the picking gap is optimally utilized. In addition, the covering hoods between the intake gaps do not protrude too high in the rear area of the picking gap. Here again, a deviation of the angle by plus or minus 5° is non-critical, as it results in only an insignificant increase in overall width.

According to one embodiment of the invention, in the deflection area of the rear deflecting wheel, the carrier elements pass over a threshold at the rear end of the picking gap, which threshold forms the transition from the picking plates to the trough of the transverse conveying device. The offset configuration of the carrier elements and the oblique positioning of the axes of rotation of the rear deflecting wheels result in this area in an upwardly directed movement of the carrier elements, which causes the crop material transported by said carrier elements to separate more easily from them and slide obliquely downward into the active region of the transverse auger as the transverse conveying device, while the carrier element moves upward away from the harvested material. This reduces the risk of clogging and of material accumulating in the area of transition, where the carrier elements reach the covering hood, beneath which they turn and move toward the front again.

According to one embodiment of the invention, at least one picking rotor has a plurality of cutting disks, distributed over its length and supported by the shaft of the picking rotor, said cutting disks projecting radially beyond the cylindrical body of said picking rotor and extending up to or into the boundary circle of the adjacent picking rotor. A cutting device integrated into the picking rotors for chopping up stalks and leaf debris that have been pulled down by the picking rotors saves on installation space, which is particularly scarce with very narrow row widths.

According to one embodiment of the invention, drive shafts of side-by-side rear deflecting wheels are covered up to the transverse conveying device by a cover plate, which extends upward from the threshold up to the plane of rotation of the adjacent rear deflecting wheels. The cover plate may be formed from a single part or multiple parts. The cover plate prevents crop material from being carried along by the drive shafts and/or by the rear deflecting wheels and being wound up into a thick layer of material. This is advantageous particularly because the carrier elements moving upward in the region of the rear deflecting wheels might carry crop material along and transport it upward in the transition area. Moreover, without the cover plate, material being conveyed sideways by the transverse conveying device might reach the area of the drive shafts. The cover plate prevents this.

According to one embodiment of the invention, the continuous conveyors and picking rotors assigned to a picking gap are driven by a common series gearbox, wherein the series gearbox for driving each continuous conveyor has a first gear stage from a main drive shaft to an intermediate shaft and a second gear stage from the intermediate shaft to the shaft on which the rear deflecting wheel of the continuous conveyor is mounted for conjoint rotation, and wherein the first gear stage is embodied as an angular gear, so that the intermediate shaft is not parallel to the main drive shaft. The series gearbox can be used in modular form in a device. For instance, 6, 8 or 10 series gearboxes can be mounted side by side on the frame, depending on whether the device is configured widthwise for a harvesting capacity of 6, 8 or 10 rows. As viewed from the rear, the series gearbox is approximately Y-shaped, with the two branches in which the shaft for driving the rear deflecting wheel is located extending obliquely upward and projecting laterally somewhat. This enables the series gearbox to be configured as narrow enough that, despite a main drive shaft extending centrally through said gearbox, a single series gearbox can contain all the outputs required for the continuous conveyors and picking rotors, even with 15-inch row widths. When cutting disks are used on at least one picking rotor for chopping up stalks and leaves, a separate output for a chopping device can be dispensed with, thereby further simplifying the series gearbox.

According to one embodiment of the invention, a shaft connection for continuing the main drive shaft is located between adjacent series gearboxes. The angled positioning of the outputs for the rear deflecting wheels of the continuous conveyors creates installation space beneath said outputs, in which a shaft connection for continuing the main drive shaft can be located between the adjacent series gearboxes. The series gearboxes can thus be connected to one another on the frame, with the interposition of a shaft connection therebetween. For maintenance and repair work, the series gearboxes can simply be removed in series from the frame as needed.

According to one embodiment of the invention, an overload clutch is located in the series gearbox between the main drive shaft and the first angular gear and/or the second angular gear. Known devices, such as a cam clutch, a ball clutch, a shear pin clutch or the like, may be used as overload clutches. It is advantageous for one or both overload clutches to be housed centrally and protected in the narrow installation space between the 15-inch row width and within the common gearbox housing.

According to one embodiment of the invention, at least two picking rotors arranged along the picking gap are located below the picking plates, the boundary circles of said picking rotors overlapping at least in certain areas. The use of at least two picking rotors below the picking plates, combined with the above-described system for transporting picked ears of corn, results in a picking system that is still very narrow, but is nevertheless very efficient, in which the cornstalks are reliably captured and transported downward, while the ears of corn are reliably transported rearward.

According to one embodiment of the invention, stationary or rotating blades are arranged spaced from one another along the length of the picking gap and extending into the boundary circles of the picking rotors. The stationary or rotating blades very efficiently shred the residual plant material that is pulled downward through the picking gap. Despite the narrow overall width of picking units that are intended for row spacings of only 15 inches, the use of stationary or rotating blades that extend into the boundary circles of the picking rotors enables high forward travel speeds during harvesting, while good shredding capacity is maintained.

It is expressly understood that the above-described embodiments of the invention can each be combined individually, or in any combination with one another, with the subject matter of the main claim.

Further modifications and embodiments of the invention may be found in the following subject matter description and in the set of drawings.

BRIEF DESCRIPTION OF THE DRAWINGS

The invention will be described below in reference to an exemplary embodiment. The drawings show.

DESCRIPTION OF PREFERRED EMBODIMENTS

Figure 1:
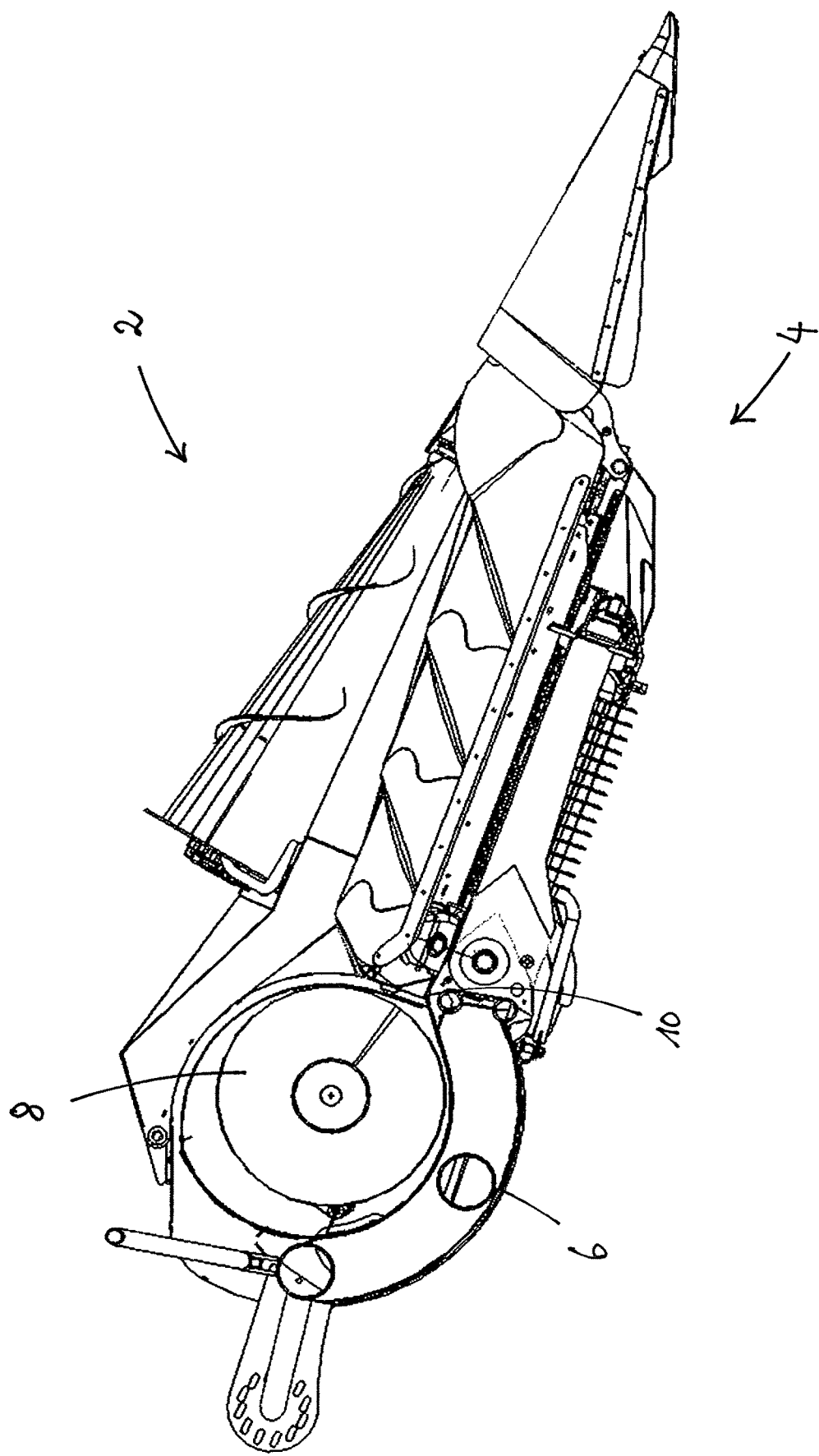
FIG. 1: a cross-sectional view along the longitudinal axis of the device.

FIG. 1 shows a cross-sectional view of a device 2, along the longitudinal axis of the device 2. The picking units 4 extend along the longitudinal axis. In device 2, picking units 4 are mounted side by side on frame 6. At the rear of device 2, a transverse conveying device 8 is located, configured in the exemplary embodiment as a transverse auger. In the transition area from picking units 4 to transverse conveying device 8 is a threshold 10, via which picked ears of corn are transported into the active region of the transverse conveying device.

Figure 2:
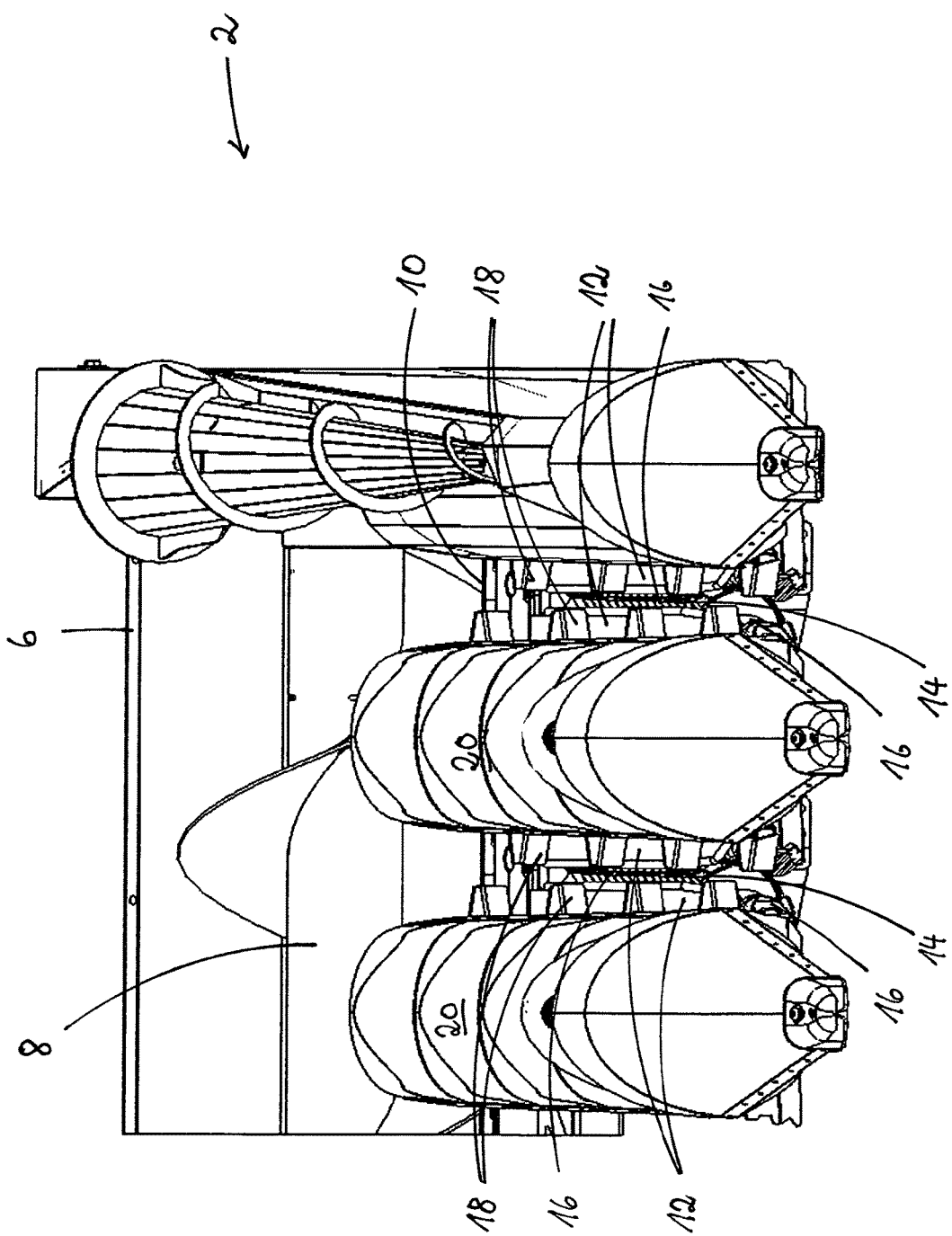
FIG. 2: a view of a part of the device from the front.

FIG. 2 shows a view of device 2 from the front. FIG. 2 shows the left end of a corn picker, as viewed in the direction of travel. FIG. 2 shows two picking gaps 14, each delimited by two laterally adjacent picking plates 12. Located below each of the picking plates 12 in the exemplary embodiment are two picking rotors 16, although only one picking rotor 16 is clearly visible in each case in FIG. 2. Located above the picking plates 12 are a number of carrier elements 18, which are attached to a continuous conveyor 22, not visible in FIG. 2. In FIG. 2, each of the continuous conveyors 22 is covered by a covering hood 20.

As is clear from the diagram of FIG. 2, the ears of corn, which are held back by the picking plates 12, are carried rearward by the carrier elements 18 traveling along the picking gaps 14, and are transported over threshold 10 into the active region of transverse conveying device 8. The stalks and leaves of the corn plants are carried downward through picking gap 14 by picking rotors 16, and are thereby removed from the picking area.

Figure 3:
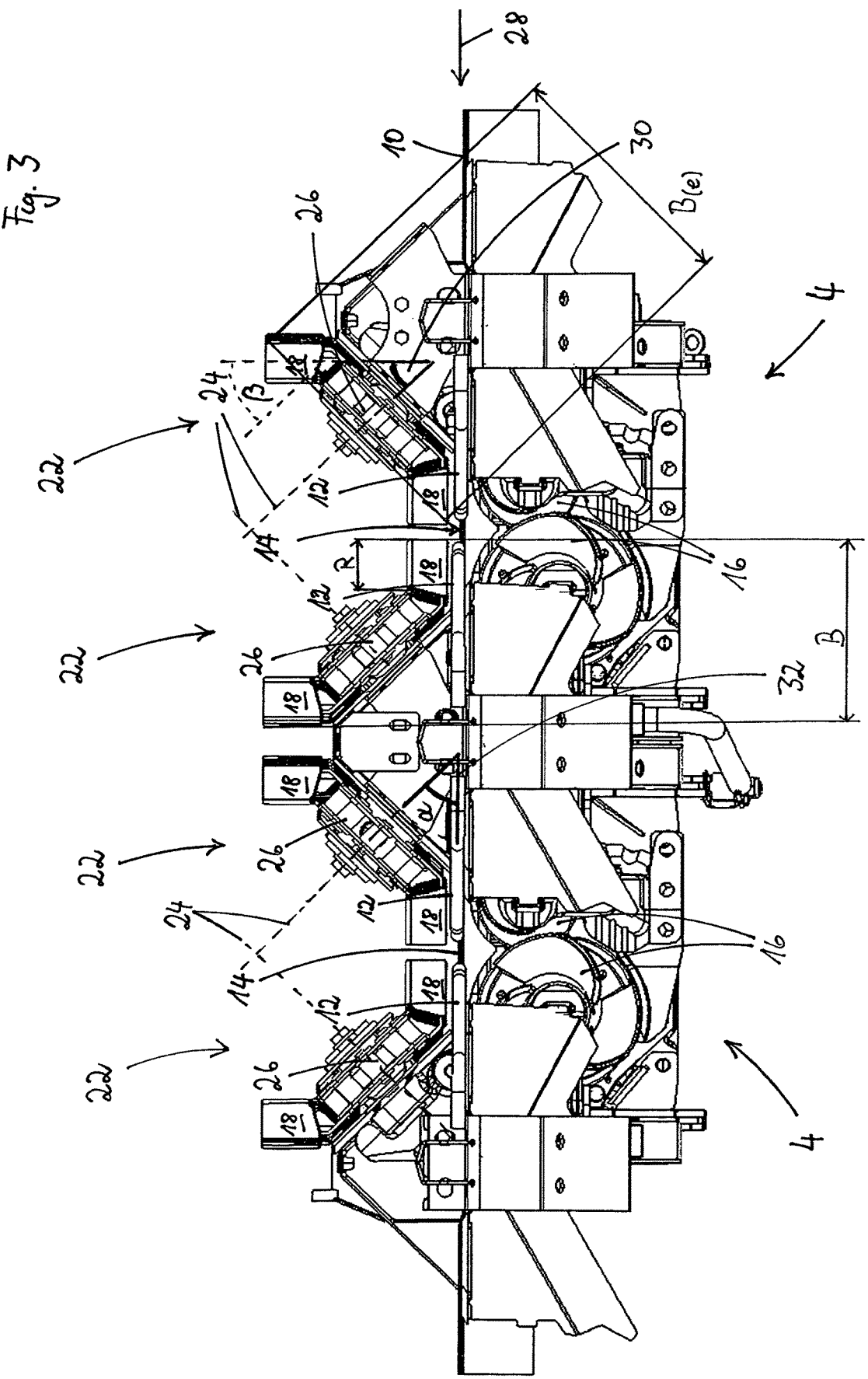
FIG. 3: a transverse sectional view of two picking gaps.

FIG. 3 shows a transverse sectional view of two picking gaps lying side by side. Clearly visible in FIG. 3 are the four continuous conveyors 22, with 2 conveyors being assigned to each picking gap 14. As is clear from the sectional view of FIG. 3, the two picking rotors 16 are located below the picking plates 12. Each of the continuous conveyors 22 has a deflecting wheel 26 at its front end and another at its rear end, around which the chains or belts of the continuous conveyor 22 circulate continuously. Carrier elements 18 are mounted rigidly on the chains or belts of continuous conveyors 22. In terms of their direction of rotation, continuous conveyors 22 are driven such that carrier elements 18 travel along picking plates 12 and picking gap 14 to the rear, where they are deflected by the respective rear deflecting wheel 26 to travel forward again, extending upward, back to the front deflecting wheel 26, where they are again deflected, allowing them to pick up more crop material and travel rearward again over picking plates 12. Carrier elements 18 thus circulate continuously.

In the exemplary embodiment, the axes of rotation 24 of deflecting wheels 26 are positioned at the angle 32 in relation to picking plane 28. In the exemplary embodiment, angle 32 is 45°. Carrier elements 18 are also positioned in relation to the plane of rotation of deflecting wheels 26 and the axis of rotation 24 of deflecting wheels 26, specifically by the angle 30. In the exemplary embodiment shown in FIG. 3, angle 30 is likewise 45°.

As is clear from the sectional view of FIG. 3, the carrier elements 18 traveling rearward above picking plates 12 travel just above the picking plane 28, whereas the carrier elements 18 traveling back toward the front travel forward offset laterally from and spaced vertically a certain distance from picking gaps 14. The angular positioning of the axes of rotation 24 of deflecting wheels 26 gives the continuous conveyors a relatively narrow overall width B as viewed over the width of device 2, despite a considerably wider effective overall width B(e). This design gives the carrier elements 18 a range R, which leaves sufficient space in the area of the picking plate plane 28 for the ears of corn to be separated cleanly from the stalks, but also enables the ears of corn to be effectively transported away afterward by the carrier elements 18.

Although in the exemplary embodiment shown in FIG. 3 carrier elements 18 are connected rigidly to the chain or the belt of the continuous conveyor 22, in an alternative embodiment, carrier elements 18 may also be connected to the associated chain or the associated belt via a pivot joint, allowing the carrier elements 18 to be placed, by way of gravity and/or motion links, in a position relative to the chain or the belt and relative to the picking plates 12 with the picking gap 14, that is favorable for a specific function. The imaginary extensions of axes of rotation 24, where such axes are not actually present, are indicated as dashed lines.

In the exemplary embodiment shown, the front and rear deflecting wheels 26 for each continuous conveyor 22 are shown in the same plane. However, it is also conceivable for the axes of rotation of the front and rear deflecting wheels 26 of a continuous conveyor 22 to be set at different angular positions from one another. If the rear deflecting wheel 26 is set at a shallower angle, covering hood 20 may also be designed as shallower in the rear area, for example; however in that case, the conveying channel, which is delimited by the side walls of the covering hoods 20 and the continuous conveyors 22, which then extend converging with one another toward the rear, is narrowed. If the rear deflecting wheel is set at a steeper angle, the conveying channel will be wider in this area, however covering hood 20 will also project higher.

As is clear from the sectional view of FIG. 3, the angled position of the axes of rotation 24 of 45° from picking plane 28 in the exemplary embodiment and the offset of carrier elements 18 by 45° from the axes of rotation 24 in the exemplary embodiment result in an effective compromise between an optimally space-saving design and a conveying channel of sufficient width above picking gap 14. Angles α and β are likewise indicated in FIG. 3. Carrier elements 18, which are directed upward during their forward travel, have an overall width in this upright position that is narrower than their width that is used for transport in the area of picking plane 28.

Figure 4:
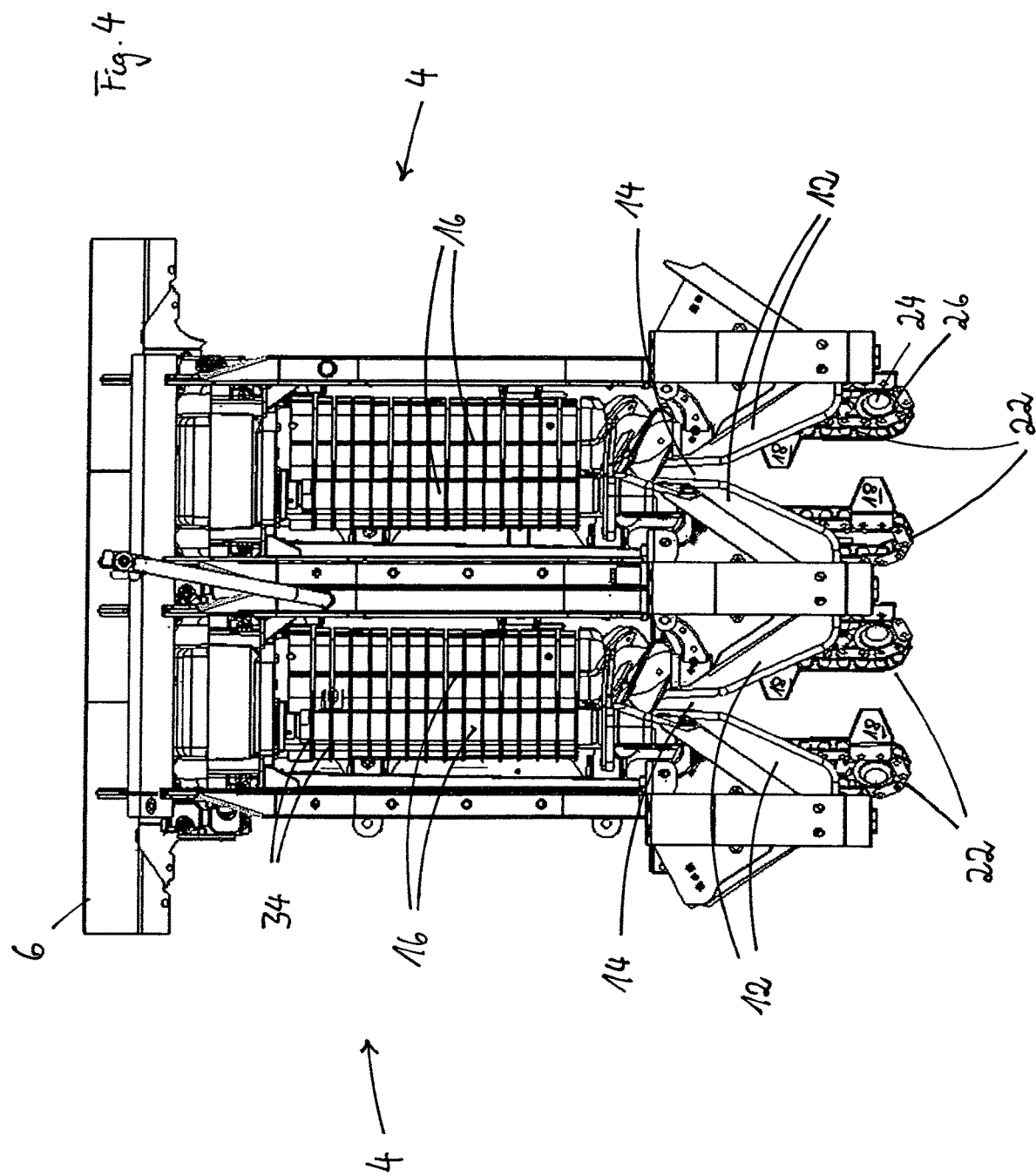
FIG. 4: a view from below of two picking units.

FIG. 4 shows a view of two picking units 4 from below. Shown at the front of picking units 4 are continuous conveyors 22, with the carrier elements 18 of each facing picking gap 14. The intake region upstream of picking gap 14, which opens up in roughly a V-shape, is also delimited by the mutually facing edges of picking plates 12. Picking rotors 16 are aligned with their longitudinal axes parallel to the path of picking gap 14. The boundary circles of the two picking rotors 16 mesh with one another. Each of the picking rotors 16 has a cylindrical body that forms the core of a picking rotor 16. Crushing plates may also be provided, projecting radially beyond the cylindrical body. On at least one picking rotor 16, cutting disks 34 may be arranged, protruding radially beyond the cylindrical body of said picking rotor 16 and extending up to or into the boundary circle of the adjacent picking rotor 16. In the adjacent picking rotor 16 grooves may be formed, into which the cutting disks 34 reach.

Figure 5:
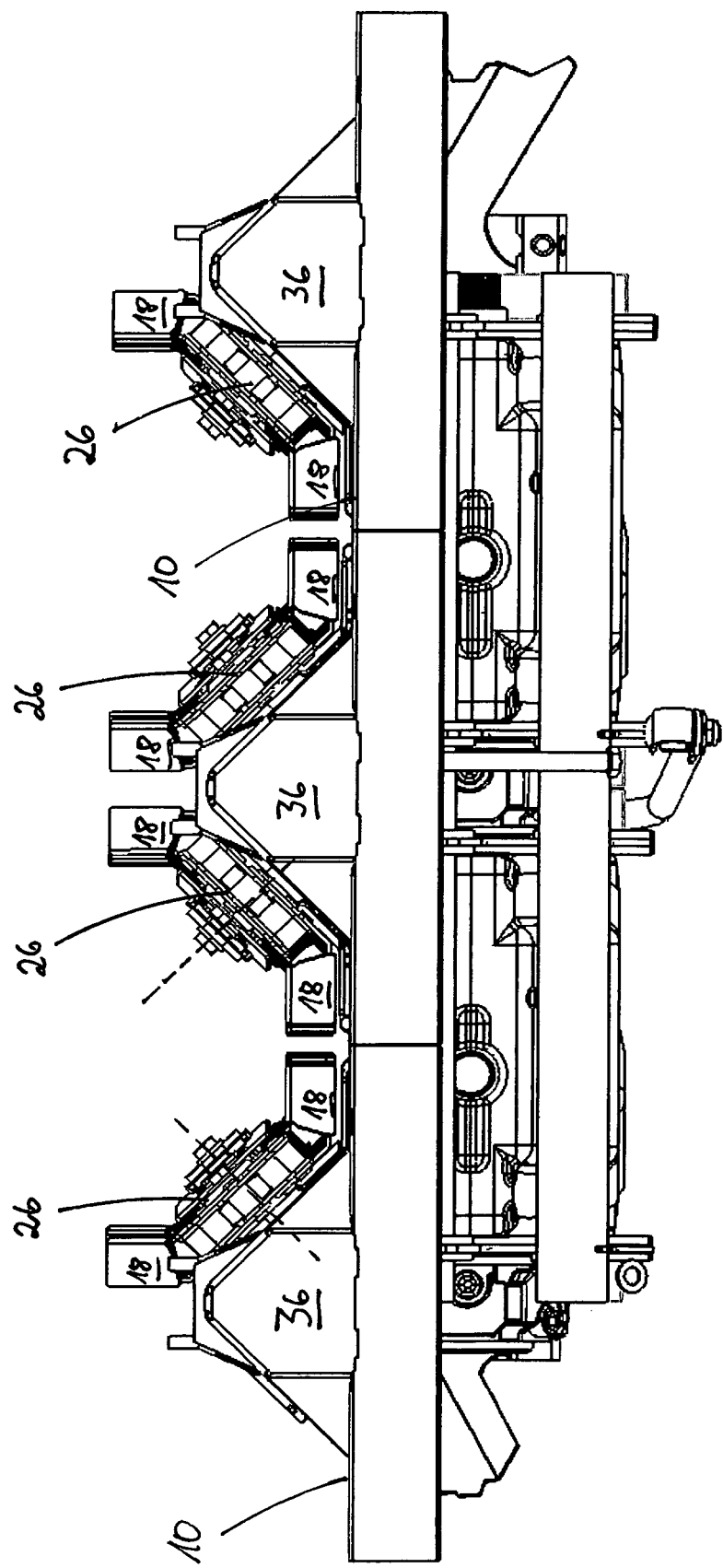
FIG. 5: a view from the rear of the rear deflecting wheels.

FIG. 5 shows a view of the rear deflecting wheels 26 from the rear. Three cover plates 36 protrude above threshold 10, covering the drive shafts of adjacent rear deflecting wheels 26 arranged side by side, up to the transverse conveying device, and preventing crop material from penetrating therein. Cover plates 36 likewise prevent crop material that is being transported in the transverse direction behind the rear deflecting wheels 26 by transverse conveying device 8 from entering the area of the drive shafts. Cover plates 36 are roughly triangular in shape and protrude from threshold 10 into the area of the plane of rotation of the adjacent rear deflecting wheels 26.

Figure 6:
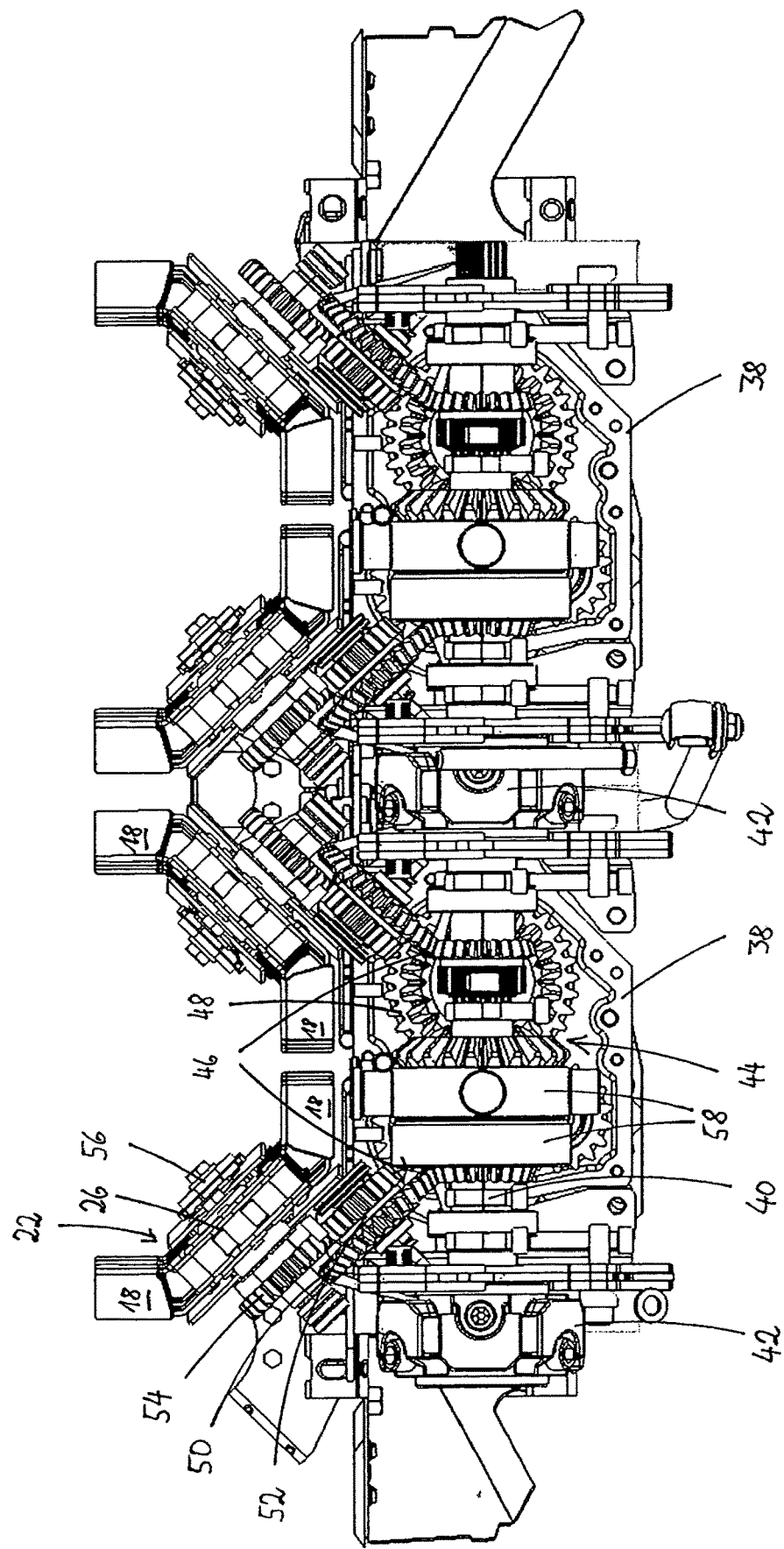
FIG. 6: a diagram of a series gearbox for a picker unit.

FIG. 6 shows a view from the rear of an assembly of two series gearboxes 38 with the gearbox covers opened. Main drive shaft 40 extends transversely through each series gearbox 38. The shaft sections of main drive shaft 40 that extend transversely through series gearboxes 38 are connected to one another by shaft connections 42, which bridge the gap between adjacent series gearboxes 38. In series gearbox 38, a first angular gear 44 and a second angular gear 46 are shown. The first angular gear 44 serves to drive picking rotor drive 48, this drive also being transmitted via a further spur gear to the second picking rotor. The two second angular gears 46 each serve to drive a continuous conveyor 22. The first and second angular gears 44, 46 are each configured as a bevel gears.

The second angular gears 46 are designed to transmit driving force via a first gear stage 50 to the intermediate shaft 52. From there, the driving force is transmitted via a second gear stage 54 to the shaft 56, on which the rear deflecting wheel 26 of a continuous conveyor 22 is mounted for conjoint rotation. The rear deflecting wheel 26 acts as a gear to drive the chain, or acts as a belt pulley to drive the belt of continuous conveyor 22 with carrier elements 18.

Located in each series gearbox 38 between main drive shaft 40 and the first angular gear 44 and/or the second angular gear 46 is an overload clutch 58. In the event of an overload, overload clutches 58 can interrupt the drive transmission to the picking rotors and/or to the continuous conveyors.

The exemplary embodiment described above is intended merely to illustrate the invention. The invention is not limited to the exemplary embodiment shown. A person skilled in the art will have no difficulty modifying the exemplary embodiment in a way that appears suitable to adapt it to a specific application.

What is claimed is:

1. A device (2) for harvesting stalk-like stem crops, the device (2) comprising:
   picking units (4) arranged side by side on a frame (6) of the device (2), the picking units (4) each comprising picking plates (12) that laterally delimit a picking gap (14) and further comprising picking rotors (16) located beneath said picking plates (12),
   conveying units located above the picking units (4) and embodied as continuous conveyors (22) driven in circulation, wherein the continuous conveyors (22) each comprise a front deflecting wheel (26) and a rear deflecting wheel (26) and a circulating element comprising carrier elements (18) and circulating about the front defecting wheel (26) and the rear deflecting wheel (26), wherein the carrier elements (18) are positioned pointing upwardly relative to a plane of rotation of the front deflecting wheel (26), wherein the picking units (4) each have two of the continuous conveyors (22) assigned thereto, respectively, wherein said two continuous conveyors (22) are arranged on opposite sides of the picking gap (14) above the picking gap (14),
   a transverse conveying device (8) located downstream of the continuous conveyors (22),
   wherein the front deflecting wheel (26) comprises an axis of rotation (24) positioned obliquely at a first angle (32) transversely to a working width of the device (2) and to a picking plane (28) of the device (2), wherein the picking plane (28) is defined by mutually facing front edges of the picking plates (12) delimiting the picking gap (14) of the picking units (4), such that imaginary extensions of the axes of rotation (24) of the front deflecting wheels (26) of said two continuous conveyors (22) assigned to the picking units (4), respectively, intersect each other above the picking plates (12) at a distance from the picking plane (28),
   wherein the carrier elements (18) of the circulating element are positioned pointing upwardly at a second angle (30) relative to the axis of rotation (24) of the front deflecting wheel (26);
   wherein in a deflection area of the rear deflecting wheel (26), the carrier elements (18) pass over a threshold (10) at a rear end of the picking gap (14), wherein the threshold forms a transition from the picking plates (12) to a trough of the transverse conveying device (8).

2. The device (2) according to claim 1, wherein the rear deflecting wheel (26) is positioned obliquely at the first angle (32) transversely to the working width of the device (2) and to the picking plane (28), and the second angle (30) of the carrier elements (18) is selected such that the carrier elements (18) circulate along a boundary curve in which, in a removal direction from the front deflecting wheel (26) toward the rear deflecting wheel (26), a lower edge of the carrier elements (18) is aligned in a plane parallel to the picking plane (28).

3. The device (2) according to claim 2, wherein the first and second angles and are each approximately or precisely 45°.

4. The device (2) according to claim 1, wherein, in some of said two continuous conveyors (22) assigned to the picking units (4), respectively, the front deflecting wheels (26) of said two continuous conveyors (22) are arranged offset from one another laterally and longitudinally along the device (2), wherein the front deflecting wheel (26) is located a greater lateral distance from a longitudinal center axis of an intake gap between said two continuous conveyors (22) than the rear deflecting wheel (26), and the front deflecting wheels and the rear deflecting wheels (26) of said two continuous conveyors (22) assigned to the picking units (4), respectively, delimit a V-shaped intake opening, in portions of which said two continuous conveyors (22) have a linear profile.

5. The device (2) according to claim 1, wherein the rear deflecting wheel (26) comprises an axis of rotation (24) positioned obliquely at a third angle (32) transversely to the working width of the device (2) and to the picking plane (28), such that the imaginary extensions of the axes of rotation (24) of said two continuous conveyors (22) intersect above the picking plane (28) at a distance from the picking plane (28).

6. The device (2) according to claim 5, wherein the third angle of the axis of rotation (24) of the rear deflecting wheel (26) is precisely or approximately 45° relative to the picking plane (28).

7. The device (2) according to claim 1, wherein at least one of the picking rotors (16) has a plurality of cutting disks (34), distributed over a length of said at least one picking rotor (16) and supported by a shaft of said at least one picking rotor (16), said cutting disks projecting radially beyond a cylindrical body of said at least one picking rotor (16) and extending up to or into a boundary circle of an adjacent picking rotor (16).

8. The device (2) according to claim 1, wherein the rear deflecting wheels (26) of the continuous conveyors (22) comprise a drive shaft, respectively, wherein the drive shafts that are arranged side by side across the working width of the device (2) are covered up to the transverse conveying device (8) by a cover plate (36), respectively, wherein the cover plate (36) projects upward from the threshold (10) to a plane of rotation of the rear deflecting wheels (26) located adjacent to the cover plate (36).

9. The device (2) according to claim 1, wherein said two continuous conveyors (22) and the picking rotors (16) of the respective picking unit (4) are driven by a common series gearbox (38), wherein the series gearbox (38) comprises for each one of said two continuous conveyors (22) a first gear stage (50) from a main drive shaft (40) to an intermediate shaft (52), and a second gear stage (54) from the intermediate shaft (52) to a shaft (56), wherein the rear deflecting wheel (26) of the continuous conveyor (22) is mounted on the shaft (56) for conjoint rotation, and wherein the first gear stage (50) is embodied as an angular gear stage, so that the intermediate shaft (52) does not extend parallel to the main drive shaft (40).

10. The device (2) according to claim 1, wherein the picking units (4) each comprises at least two of the picking rotors (16) arranged along the picking gap (14) below the picking plates (12) and comprising boundary circles overlapping at least in certain areas.

11. The device (2) according to claim 10, wherein the picking units (4) comprise stationary or rotating blades that are arranged spaced from one another along a length of the picking gap (14) and extend into the boundary circles of the picking rotors (16).

12. A device (2) for harvesting stalk-like stem crops, the device comprising:
picking units (4) arranged side by side on a frame (6) of the device (2), the picking units (4) each comprising picking plates (12) that laterally delimit a picking gap (14) and further comprising picking rotors (16) located beneath said picking plates (12),
conveying units located above the picking units (4) and embodied as continuous conveyors (22) driven in circulation, wherein the continuous conveyers (22) each comprise a front deflecting wheel (26) and a rear deflecting wheel (26) and a circulating element comprising carrier elements (18) and circulating about the front defecting wheel (26) and the rear deflecting wheel (26), wherein the carrier elements (18) are positioned pointing upwardly relative to a plane of rotation of the front deflecting wheel (26), wherein the picking units (4) each have two of the continuous conveyors (22) assigned thereto, respectively, wherein said two continuous conveyors (22), are arranged on opposite sides of the picking gap (14) above the picking gap (14),
a transverse conveying device (8) located downstream of the continuous conveyors (22),
wherein the front deflecting wheel (26) comprises an axis of rotation (24) positioned obliquely at a first angle (32) transversely to a working width of the device (2) and to a picking plane (28) of the device (2), wherein the picking plane (28) is defined by mutually facing front edges of the picking plates (12) delimiting the picking gap (14) of the picking units (4), such that imaginary extensions of the axes of rotation (24) of the front deflecting wheels (26) of said two continuous conveyors (22) assigned to the picking units (4), respectively, intersect each other above the picking plates (12) at a distance from the picking plane (28),
wherein the carrier elements (18) of the circulating element are positioned pointing upwardly at a second angle (30) relative to the axis of rotation (24) of the front deflecting wheel (26);
wherein said two continuous conveyors (22) and the picking rotors (16) of the respective picking unit (4) are driven by a common series gearbox (38), wherein the series gearbox (38) comprises for each one of said two continuous conveyors (22) a first gear stage (50) from a main drive shaft (40) to an intermediate shaft (52), and a second gear stage (54) from the intermediate shaft (52) to a shaft (56), wherein the rear deflecting wheel (26) of the continuous conveyor (22) is mounted on the shaft (56) for conjoint rotation, and wherein the first gear stage (50) is embodied as an angular gear stage, so that the intermediate shaft (52) does not extend parallel to the main drive shaft (40);
wherein a shaft connection (42) for continuing the main drive shaft (40) is located between adjacent ones of the series gearboxes (38).

13. A device (2) for harvesting stalk-like stem crops, the device comprising:
picking units (4) arranged side by side on a frame (6) of the device (2), the picking units (4) each comprising picking plates (12) that laterally delimit a picking gap (14) and further comprising picking rotors (16) located beneath said picking plates (12),
conveying units located above the picking units (4) and embodied as continuous conveyors (22) driven in circulation, wherein the continuous conveyers (22) each comprise a front deflecting wheel (26) and a rear deflecting wheel (26) and a circulating element comprising carrier elements (18) and circulating about the front defecting wheel (26) and the rear deflecting wheel (26), wherein the carrier elements (18) are positioned pointing upwardly relative to a plane of rotation of the front deflecting wheel (26), wherein the picking units (4) each have two of the continuous conveyors (22) assigned thereto, respectively, wherein said two continuous conveyors (22), are arranged on opposite sides of the picking gap (14) above the picking gap (14),
a transverse conveying device (8) located downstream of the continuous conveyors (22),
wherein the front deflecting wheel (26) comprises an axis of rotation (24) positioned obliquely at a first angle (32) transversely to a working width of the device (2) and to a picking plane (28) of the device (2), wherein the picking plane (28) is defined by mutually facing front edges of the picking plates (12) delimiting the picking gap (14) of the picking units (4), such that imaginary extensions of the axes of rotation (24) of the front deflecting wheels (26) of said two continuous conveyors (22) assigned to the picking units (4), respectively, intersect each other above the picking plates (12) at a distance from the picking plane (28),
wherein the carrier elements (18) of the circulating element are positioned pointing upwardly at a second angle (30) relative to the axis of rotation (24) of the front deflecting wheel (26);

wherein said two continuous conveyors (22) and the picking rotors (16) of the respective picking unit (4) are driven by a common series gearbox (38), wherein the series gearbox (38) comprises for each one of said two continuous conveyors (22) a first gear stage (50) from a main drive shaft (40) to an intermediate shaft (52), and a second gear stage (54) from the intermediate shaft (52) to a shaft (56), wherein the rear deflecting wheel (26) of the continuous conveyor (22) is mounted on the shaft (56) for conjoint rotation, and wherein the first gear stage (50) is embodied as an angular gear stage, so that the intermediate shaft (52) does not extend parallel to the main drive shaft (40);

wherein an overload clutch (58) is located in the series gearbox (38) between the main drive shaft (40) and a first angular gear (44) and/or a second angular gear (46) of the series gearbox (38).

* * * * *